US012695355B2

(12) United States Patent
Hegde et al.

(10) Patent No.: US 12,695,355 B2
(45) Date of Patent: Jul. 28, 2026

(54) THREE PIECE COOLANT CONTROLLED ROTOR SHAFT

(71) Applicant: DANA TM4 INC., Boucherville (CA)

(72) Inventors: Sandesh Rathnavarma Hegde, Laval (CA); Hubert Senez, Montreal (CA); Alexandre Pare, Saint-Amable (CA); Carl Trudel, Boucherville (CA)

(73) Assignee: DANA TM4 INC., Boucherville (CA)

( * ) Notice: Subject to any disclaimer, the term of this patent is extended or adjusted under 35 U.S.C. 154(b) by 233 days.

(21) Appl. No.: 18/756,401

(22) Filed: Jun. 27, 2024

(65) Prior Publication Data

US 2026/0005574 A1 Jan. 1, 2026

(51) Int. Cl.
H02K 7/00 (2006.01)
F16C 3/02 (2006.01)
H02K 7/04 (2006.01)

(52) U.S. Cl.
CPC ............ H02K 7/003 (2013.01); F16C 3/023 (2013.01); H02K 7/04 (2013.01); *F16C 2204/60* (2013.01); *F16C 2208/00* (2013.01); *F16C 2226/36* (2013.01); *F16C 2380/26* (2013.01)

(58) Field of Classification Search
CPC ............ H02K 7/003; H02K 7/04; H02K 1/28; H02K 1/32; F16C 3/023; F16C 2204/60; F16C 2208/00; F16C 2226/36; F16C 2380/26; F16C 3/02
See application file for complete search history.

(56) References Cited

U.S. PATENT DOCUMENTS

| | | | |
|---|---|---|---|
| 10,722,976 B2 | 7/2020 | Naito et al. | |
| 2023/0208245 A1* | 6/2023 | Shukla ................... | B64U 20/87 |
| | | | 310/51 |

OTHER PUBLICATIONS

Vanhee, S. et al., "Systems for Thermal Management of a Vehicle," U.S. Appl. No. 18/613,680, filed Mar. 22, 2024, 27 pages.

* cited by examiner

*Primary Examiner* — Joseph Ortega
(74) *Attorney, Agent, or Firm* — McCoy Russell LLP

(57) ABSTRACT

Systems are provided for a rotor assembly for an electric machine. In one example, a system includes a rotor shaft assembly, comprising a shaft; a shaft end cap having two co-axial concentric tracks with a trough therebetween at a first end of the shaft end cap, where the shaft end cap is coupled to the shaft via two co-axial concentric weld beads at the two co-axial concentric tracks of the shaft end cap; and a flow insert arranged in a cavity shaped by the shaft and the shaft end cap, where the flow insert is formed at least in part of plastic.

20 Claims, 9 Drawing Sheets

THREE PIECE COOLANT CONTROLLED ROTOR SHAFT

TECHNICAL FIELD

The present description relates generally to a rotor assembly of an electric machine.

BACKGROUND AND SUMMARY

Electric machines, such as electric motors, are used in vehicle powertrains and other systems to provide mechanical power to desired components. For example, an electric machine of a vehicle transfers torque to a gearbox of the vehicle, where the gearbox provides rotational power to wheels of the vehicle. Large loads may act on a rotor shaft of the electric machine during operation of the electric machine, and an intensity of the load may vary during operation. For example, lamination stack loads and balancing plate press fit loads act on the rotor shaft and are subjected to cycling due to temperature changes. Additionally, torque loads act on a spline side of the rotor shaft, and may vary in response to power demand on the electric machine.

A structural integrity of the rotor shaft assists in reducing degradation of the rotor shaft, and is especially of interest for rotor shafts of electric machines that operate at high revolutions per minute (RPM), such as 21,600 rpm. For multipiece rotor shafts, if joints of the rotor shaft do not maintain a structural integrity at fluctuating loads, the rotor shaft may bend. A rotor inside of a stator of the electric machine may seize due to rotor-stator interference. The seizing may result in a loss of torque transfer from the electric machine to the gearbox.

In a rotor shaft assembly where multiple pieces are physically coupled to form the rotor shaft, points of structural integrity degradation may be most common at zones where the pieces are joined. Thus, a rotor shaft assembly is desired that is joined using a method that establishes structural integrity at zones where the pieces are joined. It is further desired that the rotor shaft assembly is resistant to structural integrity degradation due to fluctuations in loads applied to the rotor shaft assembly, such as at an interface with lamination stacks, balancing plates, and/or other components driven by the rotor shaft assembly.

Additionally, to increase electric motor efficiency and continuous performance in vehicle drive units and other systems, motors have made use of cooling systems that direct pressurized oil through channels in the rotor assembly. Cooling the rotor allows the efficiency of the motor to be increased. Cooling systems may be particularly desirable in higher performance electric motors with comparatively high efficiency targets. An efficiency of the electric motor may be at least partially based on an efficiency of the cooling provided to the electric motor and its components. For example, cooling allows thermal efficiency and removal of thermal energy to be increased. The electric motor may generate more rotational power using less electrical power due to increased removal of heat, which may make windings and other electrical components more conductive. Stator windings may represent one component in which previous examples of cooling may be insufficient. Other components which may demand enhancements in cooling may include the rotor, the motor shaft, and bearings of the motor.

Thus, a rotor shaft for a high-speed electric motor is desired, where a configuration of the rotor shaft provides structural integrity and efficient cooling of the rotor shaft, while minimizing an overall mass of the rotor shaft without compromising the structural integrity.

In one example, the issues described above may be addressed by a rotor shaft assembly comprising a shaft; a shaft end cap having two co-axial concentric tracks with a trough therebetween at a second end of the shaft end cap, where the shaft end cap is coupled to the shaft via two co-axial concentric weld beads at the two co-axial concentric tracks of the shaft end cap; and a flow insert arranged in a cavity shaped by the shaft and the shaft end cap, the flow insert formed at least in part of plastic. The two co-axial concentric weld beads may be formed via capacitive discharge (CD) welding.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which.

DETAILED DESCRIPTION

Figure 1:
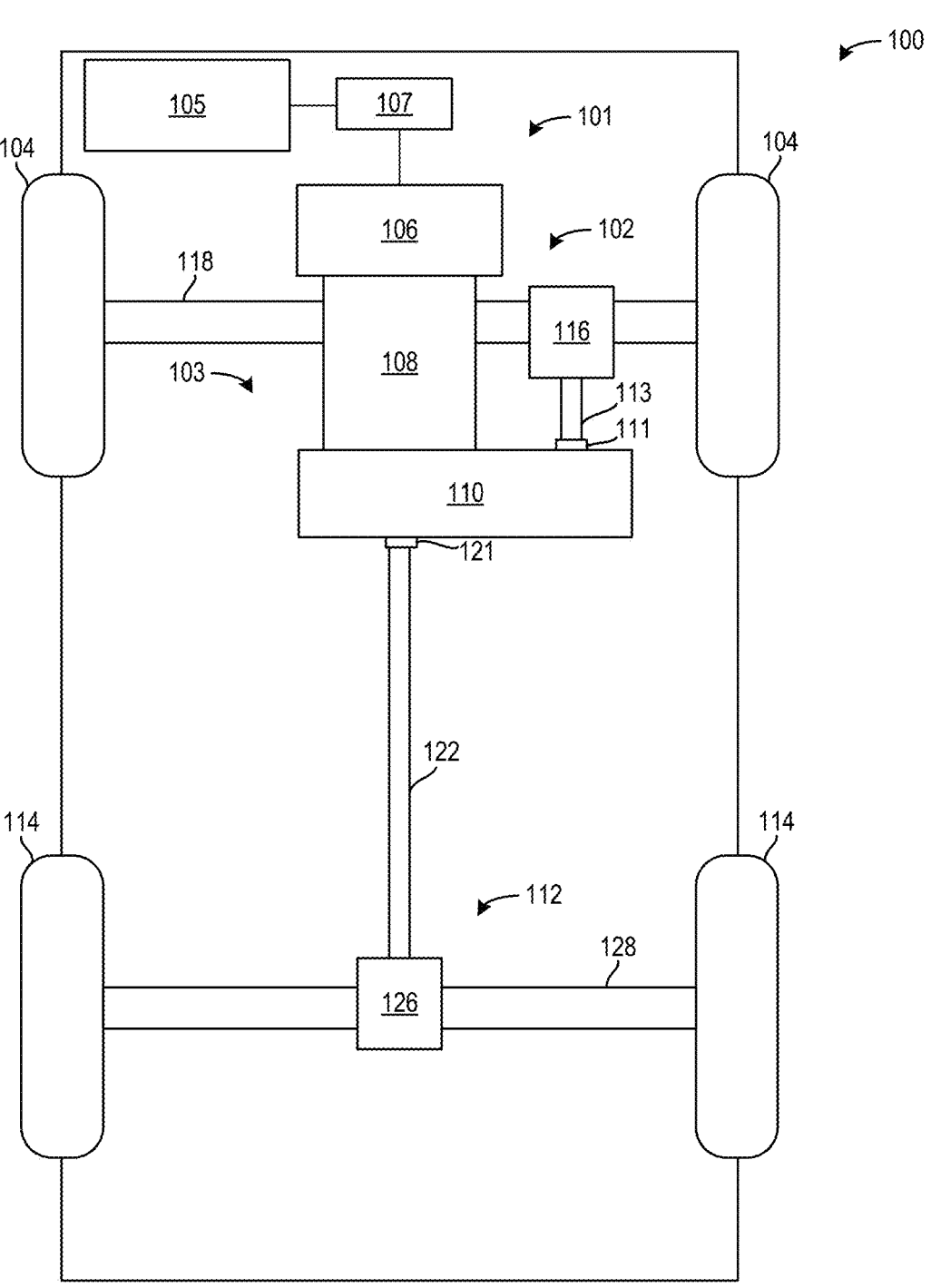
FIG. 1 is a schematic depiction of an example vehicle powertrain, according to an embodiment of the present disclosure.
Figure 2:
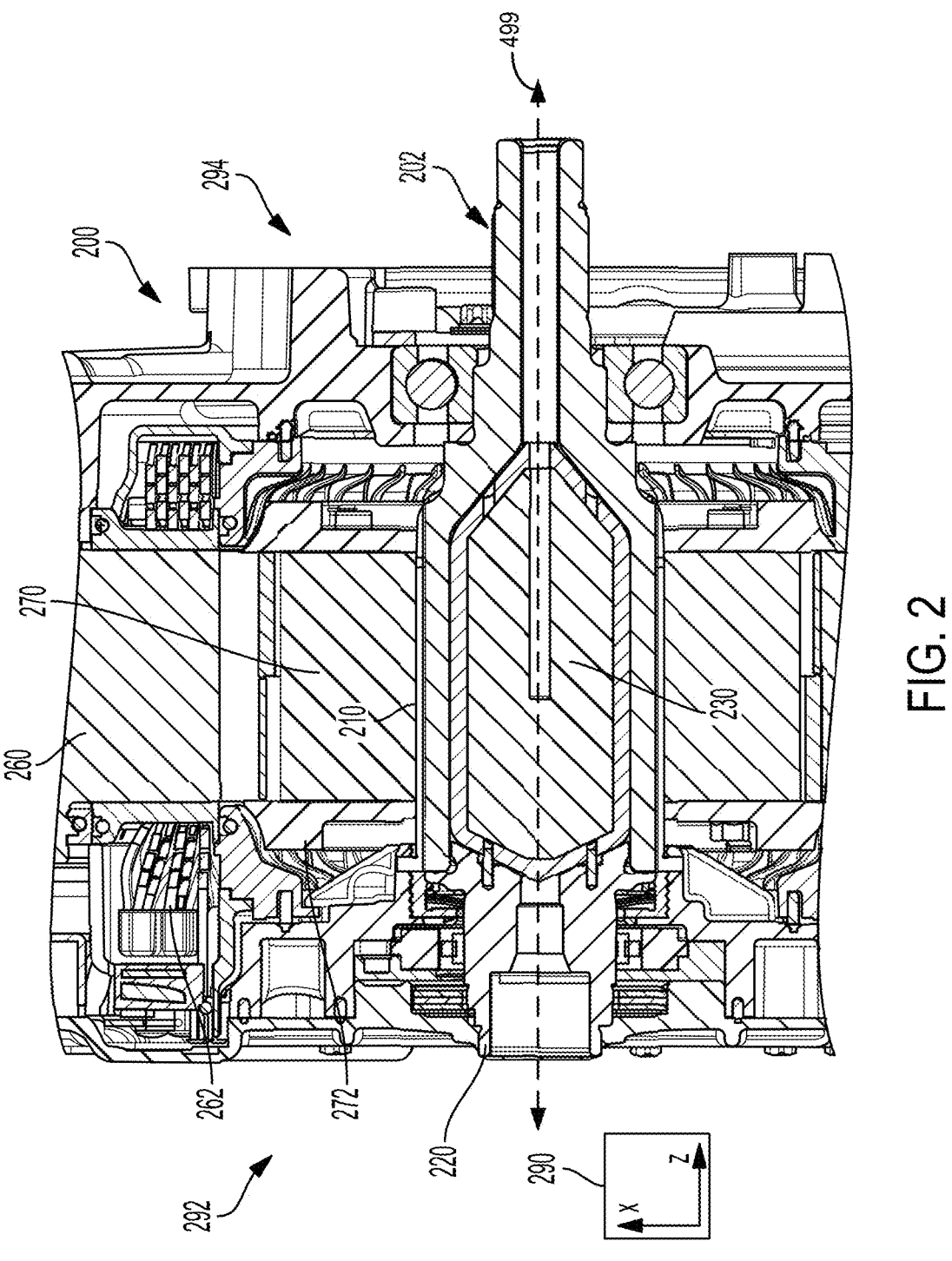
FIG. 2 is a schematic depiction of a motor of the vehicle powertrain, according to an embodiment of the present disclosure.
Figure 3:
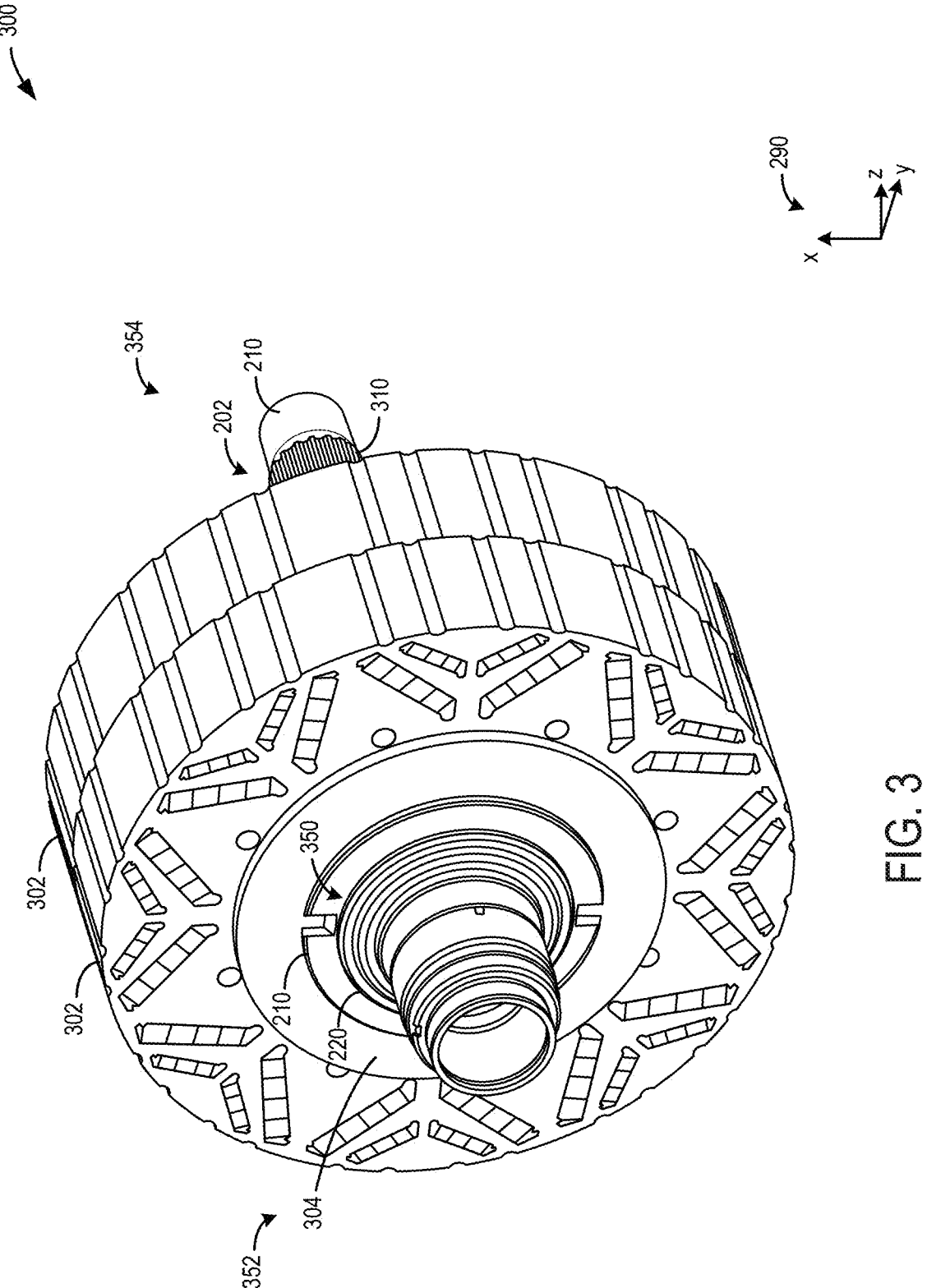
FIG. 3 is a depiction of a rotor assembly of the motor, according to an embodiment of the present disclosure.
Figure 4:
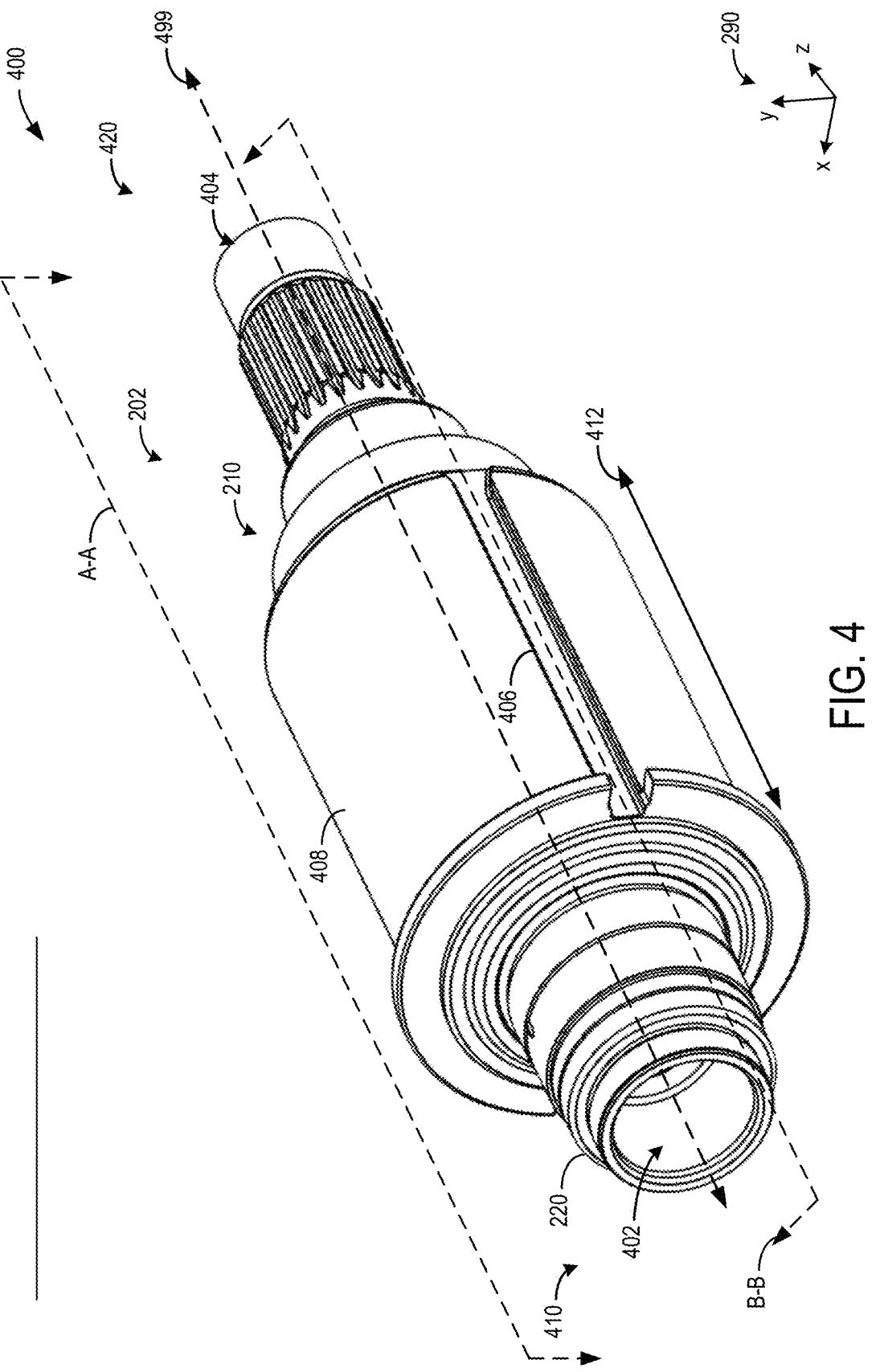
FIG. 4 is a depiction of a rotor shaft assembly of the rotor assembly, according to an embodiment of the present disclosure.
Figure 5:
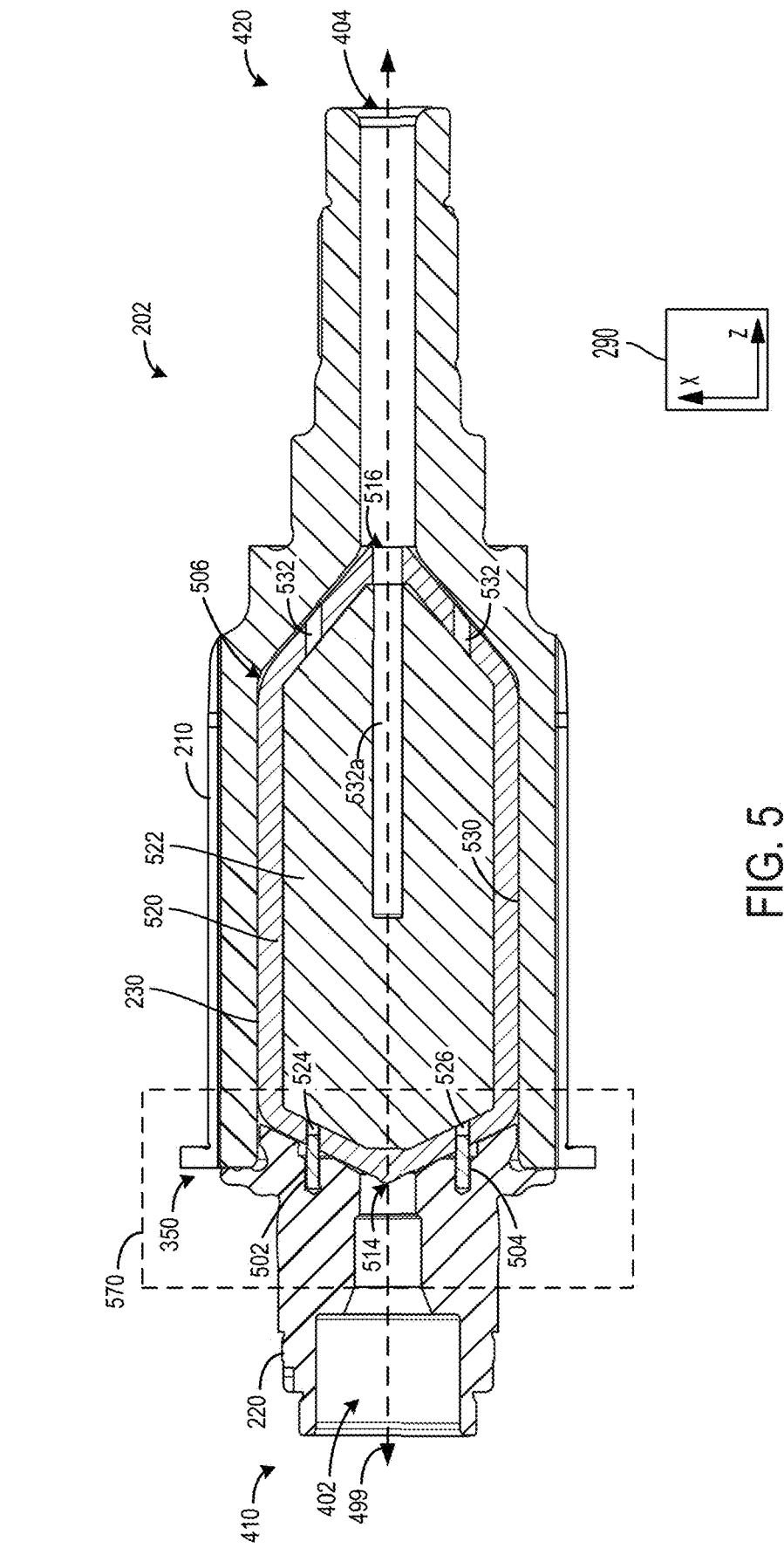
FIG. 5 is a cross-section view of the rotor shaft assembly, according to an embodiment of the present disclosure.
Figure 6:
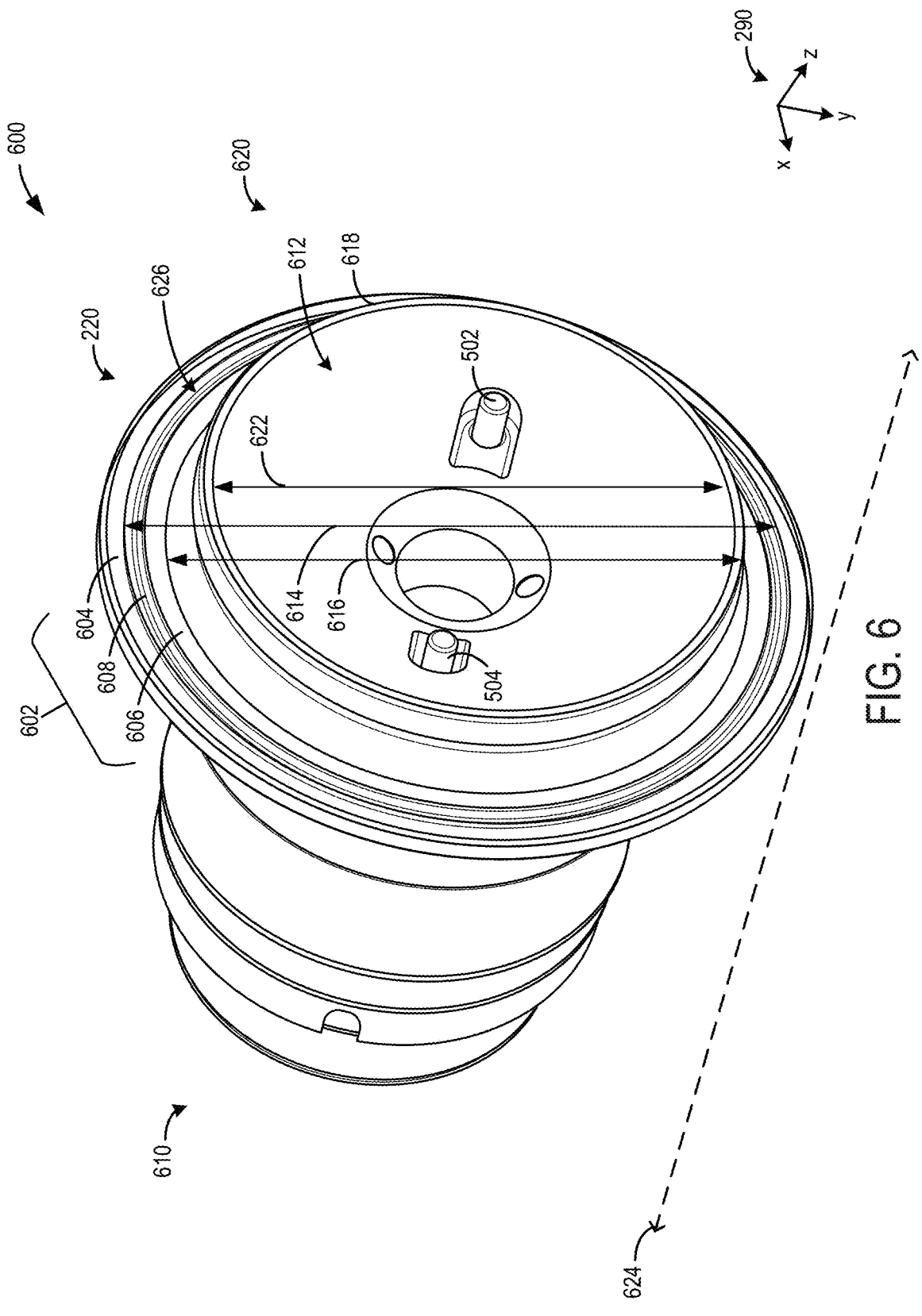
FIG. 6 is a perspective view of a shaft end cap of the rotor shaft assembly, according to an embodiment of the present disclosure.
Figure 8:
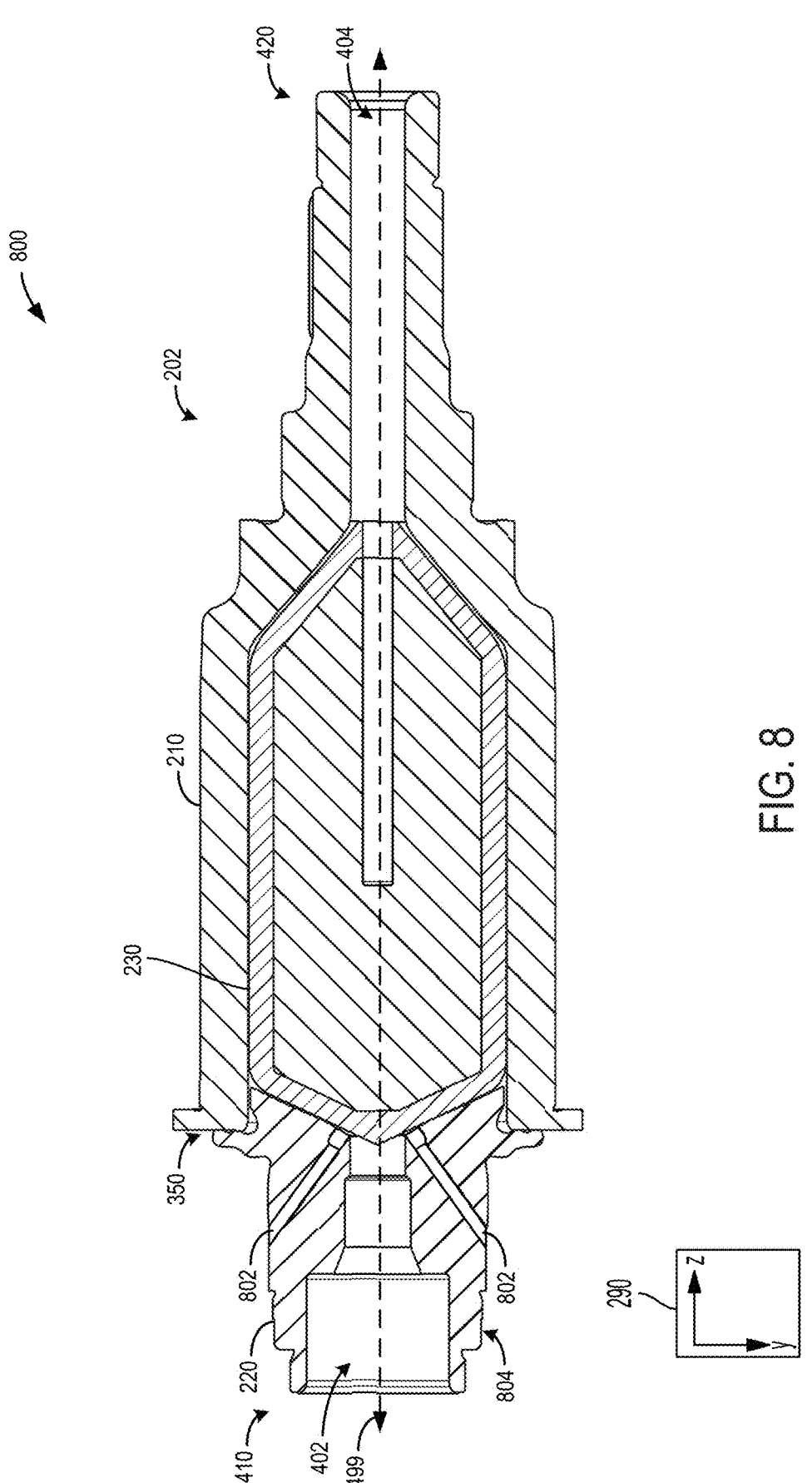
FIG. 8 is a second cross-section view of the rotor shaft assembly, according to an embodiment of the present disclosure.
Figure 9:
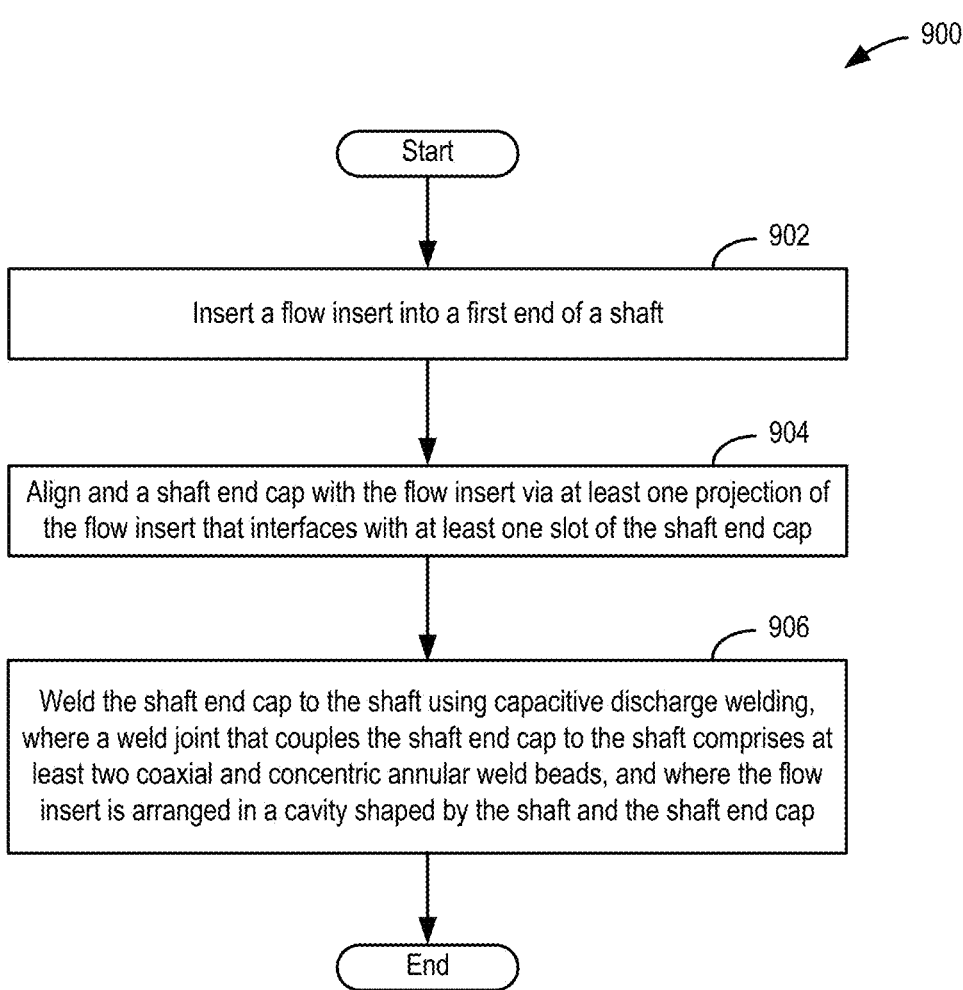
FIG. 9 is a flow chart of a method for assembling the rotor shaft assembly, according to an embodiment of the present disclosure.

The following description relates to systems for a multipiece rotor shaft assembly for a drive unit. In one example, the drive unit is an electric motor of a vehicle, as illustrated in FIG. 1. FIG. 2 is a cross-sectioned view of the electric motor, and illustrates a rotor assembly thereof. FIG. 3 shows a perspective view of the rotor assembly of the electric motor, including a rotor shaft assembly. FIG. 4 is a perspective view of the rotor shaft assembly. FIG. 5 is a cross-section view of the rotor shaft assembly, and shows a flow insert positioned in a cavity shaped by a shaft and a shaft end cap of the rotor shaft assembly. A perspective view of the shaft end cap is shown in FIG. 6. The shaft end cap is coupled to the shaft via a weld joint, a location of which is shown in detail in FIG. 7. FIG. 8 shows a second cross-sectioned view of the rotor shaft assembly, sectioned at an axis perpendicular to an axis that shows the cross-section of FIG. 5. FIG. 9 is a flow chart of a method for assembling the rotor shaft assembly, according to an embodiment of the present disclosure.

The rotor shaft assembly described herein has a relatively low overall mass and a structural integrity that is resistant to degradation. Materials used to form the flow insert and other elements of the rotor shaft assembly, as well as assembly steps used to assemble the rotor shaft assembly, may provide desired structural integrity and desired low mass of the rotor shaft assembly. Joining of the elements of the rotor shaft assembly via welds, and protrusions and corresponding sockets, provides structural integrity of the rotor shaft assembly that is resistant to degradation of the rotor shaft assembly due to fluctuations of loads on the rotor shaft assembly.

FIGS. 2-8 show example configurations with relative positioning of the various components of the present disclosure. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2-8 are shown approximately to scale, however, other dimensions may be used if desired.

Turning to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The prime mover 106 may be powered via energy from an energy storage device 105. In one example, the energy storage device 105 is a battery configured to store electrical energy. An inverter 107 may be arranged between the energy storage device 105 and the prime mover 106 and configured to adjust direct current (DC) to alternating current (AC). The prime mover 106 may include a variety of components and circuitry with thermal demands that effect an efficiency of the prime mover. As will be described herein, the prime mover 106 may include a rotor shaft assembly configured to meet the thermal demands and the structural integrity demands of the components of the prime mover 106. The rotor shaft assembly of the prime mover 106 is described in greater detail with respect to FIGS. 2-8 herein.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications. In one example, the vehicle 100 is an electric vehicle.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIG. 2, it shows an embodiment of a motor assembly 200. The motor assembly 200 is an electric machine, such as an electric motor or an electric motor generator. The motor assembly 200 may be an example assembly of the prime mover 106 of FIG. 1, configured as an electric motor. Likewise, the motor assembly 200 may be a configuration of another electric machine of the vehicle 100 of FIG. 1, such as an electric machine that outputs torque to drive the vehicle 100 via the prime mover 106. The motor assembly 200 may include a stator 260 and a rotor 270. The stator 260 may include end windings 262 arranged at opposite ends thereof. The rotor 270 may include rotor end caps 272 that interface with a portion of a rotor shaft assembly 202. The rotor 270 may be positioned radially outside of the rotor shaft assembly 202. Elements of a rotor assembly that includes the rotor 270 and the rotor shaft assembly 202 are further described with respect to FIG. 3.

An axis system 290 is shown including an x-axis parallel to an axial direction and a y-axis parallel to a vertical direction. A radial direction is parallel to a plane including the y-axis and a third axis (e.g., a z-axis) normal to the x- and y-axes. The motor assembly 200 may include a first side 292 and a second side 294. The second side 294 may be opposite the first side 292. In one example, the first side 292 is an inlet side and the second side 294 is an output side of the motor assembly 200, wherein power from the motor assembly 200 is transferred to a transmission, gearbox, wheel, or other device at the second side 294.

The rotor shaft assembly 202 may include three main parts, including a shaft 210, a shaft end cap 220, and a flow insert 230. A shaft main body is defined by the shaft 210 and the shaft end cap 220. The shaft 210 and the shaft end cap 220 are coupled to each other via a weld, as further described with respect to FIGS. 4-8. The shaft main body may rotate about an axis of rotation parallel to the x-axis based on an operation of the rotor 270. The flow insert 230 may be arranged in a cavity shaped by the shaft 210 and the shaft end cap 220. For example, a body of the shaft 210 forms a cavity, and the cavity may be sealed via the shaft end cap 220. The flow insert 230 may move axially within the cavity. For example, axial play of the flow insert 230 inside the cavity is between 0.05 mm and 0.5 mm. The flow insert 230 interfaces with the shaft end cap 220 in such a way that rotation of the flow insert 230 is independent of the shaft end cap 220 and the shaft 210 is blocked. Described another way, the flow insert 230 may rotate about the axis of rotation with the shaft main body based on operation of the rotor 270.

FIG. 3 shows a detailed view of a rotor assembly 300, which may be included in and include elements of the motor assembly 200 of FIG. 2. The rotor shaft assembly 202 extends through lamination stacks 302 of the rotor 270 (not shown). The lamination stacks 302 may reduce losses, increase efficiency, prevent eddy currents, and direct and control a flow of magnetic fields in the rotor assembly 300. A first end 350 of the shaft 210 is coupled to the shaft end cap 220 via a weld joint. The first end 350 of the shaft 210 and the shaft end cap 220 are positioned on a first side 352 of the lamination stacks 302. A balancing plate 304 may be positioned between the shaft 210 and the first side 352 of the lamination stacks 302. The balancing plate 304 may be a circular plate with a central hole (e.g., a concentric hole) through which the shaft 210 passes. The balancing plate 304 may assist in providing balanced rotation of the rotor 270 and the lamination stacks 302. The shaft 210 extends through the lamination stacks 302 from the first side 352 to a second side 354, opposite the first side 352 of the lamination stacks 302. A second end, opposite the first end 350, of the shaft 210 extends out of the second side 354. The second end of the shaft 210 may also be referred to as a spline side of the shaft 210, as it includes a toothed region 310. The toothed region 310 is configured to mesh with teeth of a gear and/or another shaft to provide rotational output to the meshed gear and/or shaft. For example, the toothed region 310 of the shaft 210 may mesh with and provide rotational power to an input shaft and/or input gear of the transmission 108 of FIG. 1.

The rotor shaft assembly 202 is configured for high RPM use applications. A press fit interface between the shaft 210 and the lamination stacks 302 is relatively high (e.g., allowance of 3-10 μm between the shaft 210 and the lamination stacks 302). The press fit interface may counter and overcome centrifugal effects, as well as efficiently transfer heat from the lamination stacks 302 to the rotor shaft assembly 202. The weld joint between the shaft end cap 220 and the shaft 210 (further described with respect to FIGS. 5-7) is positioned away from the press fit interface between the lamination stacks 302 and the shaft 210. Thus, the weld joint may be positioned away from a high-stress region of the rotor shaft assembly 202 (e.g., the press fit region). By positioning the balancing plate 304 between the shaft 210 and the lamination stacks 302, a stress concentration at the weld joint may further be reduced.

Turning to FIG. 4, a perspective view 400 of the rotor shaft assembly 202 of FIGS. 2-3 is shown. The shaft 210 may be formed of a rigid material that may be welded, such as metal. The shaft end cap 220 may also be formed of a rigid material that may be welded, such as metal. The shaft 210 and the shaft end cap 220 may be formed of the same material or may be formed of different materials, so long as the material of the shaft 210 may be coupled to the material of the shaft end cap 220 via welding, such as capacitive discharge (CD) welding.

The shaft end cap 220 comprises an inlet 402 at a first end 410 of the rotor shaft assembly 202. The shaft 210 comprises an outlet 404 at a second end 420 of the rotor shaft assembly 202, opposite the first end 410 of the rotor shaft assembly 202. As further shown in FIG. 5, a flow path of the rotor shaft assembly 202 extends from the inlet 402 to the outlet 404. Cooling liquid, such as oil, may flow through the flow path of the rotor shaft assembly 202 to cool the rotor shaft assembly 202 during operation of an electric machine in which the rotor shaft assembly 202 is implemented (e.g., the prime mover 106). Cooling the components of the rotor shaft assembly 202 may reduce power loss and degradation of the rotor shaft assembly 202 due to undesirably high temperatures.

A design of the shaft 210 locks a rotational degree of freedom of the rotor shaft assembly 202 with respect to other elements of the rotor assembly 300 (e.g., the rotor 270, the lamination stacks 302, the balancing plate 304). For example, a body 408 of the shaft 210 includes a positioning notch 406 that extends along a length 412 of the body 408. The body 408 may include a second positioning notch (not shown) symmetric and parallel to the positioning notch 406, with respect to a central axis 499 of the rotor shaft assembly 202. One or more elements of the rotor assembly 300, such as the lamination stacks 302 of FIG. 3, may include protrusions that are complimentary to the positioning notches of the shaft 210. For example, lamination stacks 302 may be slid onto the rotor shaft assembly 202 during assembly of the rotor assembly 300, such that protrusions of the lamination stacks 302 extend into the positioning notches of the shaft 210. Engagement of the rotor shaft assembly 202 with rotating elements of the rotor assembly 300 via positioning notches of the shaft 210 may enable the rotor shaft assembly 202 to rotate with rotation of the rotating element(s). Blocking rotation of the rotor shaft assembly 202 independent of rotating elements of the motor assembly may reduce degradation of the rotor shaft assembly 202 due to friction with the other elements of the rotor assembly 300.

FIG. 5 shows a cross-sectioned side view 500 of the rotor shaft assembly 202, taken along line A-A of FIG. 4. As described above, the rotor shaft assembly 202 comprises the shaft 210, the shaft end cap 220, and the flow insert 230. The flow insert 230 is arranged in a cavity 506 shaped by the shaft 210 and the shaft end cap 220.

The flow insert 230 may include a cylindrical shape wherein a plurality of outer passages is arranged on an outer diameter of the flow insert 230. The flow insert 230 may further include conical ends, including a conical front end 514 which faces the shaft end cap 220 and includes a plurality of anti-rotation features. The flow insert 230 may further include a conical rear end 516, opposite the conical front end 514, wherein each of the conical front end 514 and the conical rear end 516 include a conical shape. Additionally or alternatively, the conical front end 514 and/or the conical rear end 516 may be frustoconical in shape. The conical front end 514 is radially symmetric with respect to the central axis 499. The conical rear end 516 is radially symmetric with respect to the central axis 499. The flow insert 230 may have a cylindrical body between the conical front end 514 and the conical rear end 516, and may have a decagon cross-sectional shape.

The flow insert 230 is formed at least in part of plastic. For example, the flow insert 230 comprises an outer shell 520 that is formed of plastic. The flow insert 230 further comprises an inner core 522. In some examples, the inner core 522 may be formed of plastic. The plastic forming the inner core 522 may be the same as the plastic forming the outer shell 520. In other examples, the plastic forming the inner core 522 may be a different material than the plastic forming the outer shell 520. In further examples, the inner core 522 may be excluded, and the outer shell 520 may be formed around a hollow space. In examples where the inner core 522 is formed of plastic and where the inner core 522 is excluded, forming the flow insert 230 of plastic may provide a reduced mass for the rotor shaft assembly 202, compared to rotor shaft assemblies where the flow insert is formed of a material that is heavier than plastic, such as metal. Additionally, by forming the flow insert 230 of plastic, the flow insert 230 may electrically isolate the shaft 210 from the shaft end cap 220 during welding.

The flow insert 230 may be fixedly held within the cavity 506 by a plurality of anti-rotation features. For example, protrusions and complementary sockets of the shaft end cap 220 and the flow insert 230 may lock a rotational degree of freedom of the flow insert 230 with respect to the shaft end cap 220 and the shaft 210. The protrusions may be inserted into, be received by, and be in surface sharing contact with the complementary sockets when locking the flow insert 230 with respect to the shaft end cap 220. Locking rotation of the flow insert 230 with respect to the shaft end cap 220 may reduce degradation of the flow insert 230 by reducing frictional wearing and vibration shock loads experienced by the flow insert 230. In the example of FIG. 5, the shaft end cap 220 comprises at least one protrusion that interfaces with at least one socket of the flow insert 230. In other examples, the protrusions may extend from the flow insert 230, and the shaft end cap 220 may be configured with sockets that are complementary to the protrusions.

In the example of FIG. 5, the shaft end cap 220 comprises a first protrusion 502 and a second protrusion 504 that extend from the shaft end cap 220 at a side of the shaft end cap 220 that is opposite the inlet 402 along the x-axis. As further described with respect to FIG. 6, the shaft end cap 220 may include a dome extension 618 from which the first protrusion 502 and the second protrusion 504 extend. Each of the at least one protrusion may be formed of stainless steel, the same material as the shaft end cap 220, and/or another rigid material. The first protrusion 502 and the second protrusion 504 may each interface with a respective socket of the inlet 402. For example, the flow insert 230 comprises a first socket 524 that is complementary to (e.g., configured to receive) the first protrusion 502, and a second socket 526 that is complementary to the second protrusion 504. The first protrusion 502 and the second protrusion 504 may have the same configuration (e.g., the same size, shape, dimensions, etc.) as each other. Described another way, the first protrusion 502 may be symmetric with the second protrusion 504. Further, the first socket 524 and the second socket 526 may have the same configuration. In one example, the first protrusion 502 and the second protrusion 504 include a cylindrical shape with a domed tip. The first socket 524 and the second socket 526 may include a frustoconical shape. When the sockets have the same configuration as each other, and the protrusions have the same configuration as each other, the protrusions are not configured to mate with a specific socket, and vice versa. In other examples, the first socket 524 is configured to receive the first protrusion 502 and not receive the second protrusion 504, and the second socket 526 is configured to receive the second protrusion 504 and not the first protrusion 502. In this way, an orientation of the flow insert 230 with respect to the shaft end cap 220 may be controlled. Some flow channels of flow insert 230 may be configured to guide liquid flow from the inlet 402 to the outlet 404 along a specific path. The specific path may demand that the flow insert 230 be positioned with respect to the shaft end cap 220 in a specific orientation. Thus, it may be desired to have the first socket 524 configured to receive the first protrusion 502, and so on with additional socket and protrusion pairs.

When each protrusion is inserted into a respective socket, rotation of the flow insert 230 with respect to the shaft end cap 220 is blocked. For example, the shaft end cap 220 and the shaft 210 may rotate about the central axis 499 to output rotational power from the electric machine (e.g., to the gearbox). The shaft end cap 220 and the shaft 210 rotate together due to being rigidly coupled (e.g., welded) together. The protrusions and complementary sockets lock the flow insert 230 to the shaft end cap 220. Therefore, the flow insert 230 rotates with rotation of the shaft end cap 220 and thus with rotation of the shaft 210, and does not rotate independent of the shaft 210 and/or the shaft end cap 220.

When the flow insert 230 is inserted into the shaft 210 (e.g., positioned in the cavity 506 formed by the shaft 210 and the shaft end cap 220) and the shaft end cap 220 is coupled to the shaft 210, liquid flow (e.g., lubricant, oil) from the inlet 402 of the shaft end cap 220 to the outlet 404 of the shaft 210 is enabled. The flow insert 230 may comprise oil flow channels. A gap between the outer shell 520 of the flow insert 230 and internal walls 530 of the shaft 210 may enable fluid (e.g., oil, lubricant) flow. For example, the gap may be a portion of the cavity 506 not filled by the flow insert 230. Oil flow channels of the flow insert 230 guide oil flow towards internal walls 530 of the shaft 210. For example, oil may flow into the rotor shaft assembly 202 via the inlet 402 of the shaft end cap 220, around the first protrusion 502 and the second protrusion 504, and into the respective socket (e.g., the first socket 524 and the second socket 526, respectively). Oil flows out of the socket and into a gap between the flow insert 230 and the shaft end cap 220 (e.g., a space of the cavity 506 that is not filled by the flow insert 230). Oil flows between the internal walls 530 of the shaft 210 and the outer shell 520 of the flow insert 230, and out of the rotor shaft assembly 202 via the outlet 404 of the shaft 210. Lubricant (e.g., oil) does not flow into or through the hollow region of the flow insert 230. The flow insert 230 further provides high dimensional accuracy, compared to other manufacturing techniques such as high pressure die casting or flow forming. The high dimensional accuracy assists in preventing pressure drop at the inlet 402 of the shaft end cap 220.

FIG. 6 shows a perspective view 600 of the shaft end cap 220 of the rotor shaft assembly 202. The perspective view 600 shows a second end 620 of the shaft end cap 220. In the assembled rotor shaft assembly 202, the second end 620 of the shaft end cap 220 faces the conical front end 514 of the flow insert 230. A first face 626 of the second end 620 of the shaft end cap 220 is coupled to the first end 350 of the shaft 210 via a weld joint, as further described with respect to FIG. 7.

The first face 626 of the shaft end cap 220 has two co-axial concentric tracks 602 with a trough 608 therebetween. A first track 604 has a first diameter 614, and a second track 606 has a second diameter 616. The first diameter 614 is greater than the second diameter 616. The first track 604 and the second track 606 may extend from the first face 626 of the shaft end cap 220 towards the second end 620 of the shaft end cap 220. The trough 608 may be formed between the first track 604 and the second track 606 as a space between the first face 626 and the extension of each of the first track 604 and the second track 606. In other examples, the trough 608 may extend into the first face 626 of the shaft end cap 220 in a direction towards the second end 620 of the shaft end cap 220. Further detail of the first track 604, the second track 606, and the trough 608 are shown in FIG. 7.

A dome extension 618 extends from the second end 620 of the shaft end cap 220, and is circumferentially surrounded by the two co-axial concentric tracks 602. A diameter of each concentric track of the two co-axial concentric tracks 602 is greater than a diameter 622 of the dome extension 618. For example, the second diameter 616 and the first diameter 614 are greater than the diameter 622 of the dome extension 618. The dome extension 618 extends beyond the two co-axial concentric tracks 602 along a length 624 of the shaft end cap 220. A concave portion 612 of the dome extension 618 faces a same direction as the first face 626 of the shaft end cap 220. Described another way, the concave portion 612 of the dome extension 618 faces away from a first end 610 of the shaft end cap 220, opposite the second end 620 of the shaft end cap 220. The dome extension 618 may be shaped to be complementary to the conical front end 514 of the flow insert 230, such that the first protrusion 502 and the second protrusion 504 may extend into the first socket 524 and the second socket 526.

Figure 7:
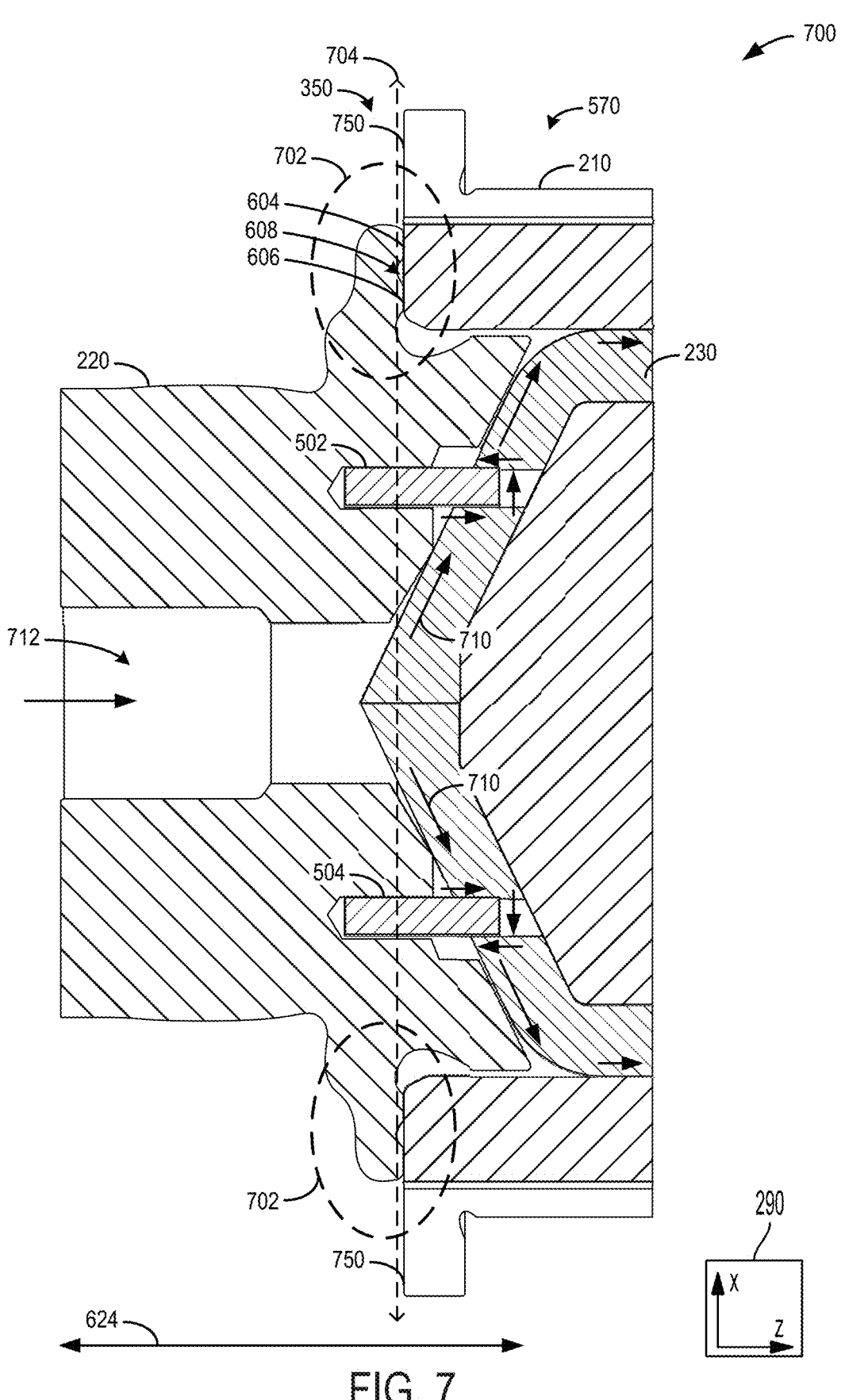
FIG. 7 is a detailed cross-section view of a weld joint between the shaft end cap and a shaft of the rotor shaft assembly, according to an embodiment of the present disclosure.

FIG. 7 shows a detailed view 700 of the shaft end cap 220 and the shaft 210, and specifically an interface therebetween, as outlined by a dashed line box 570 of FIG. 5. The interface between the shaft end cap 220 and the shaft 210 is shown in a region within a dashed oval 702, and includes a weld joint between a planar face 750 of the shaft 210 at the first end 350 of the shaft 210, and the two co-axial concentric tracks 602 of the shaft end cap 220. The first face 626 of the second end 620 of the shaft end cap 220 is represented by a dashed line 704. The weld joint comprises a first weld bead between the first track 604 of the shaft end cap 220 and the planar face 750 of the shaft 210. The weld joint further comprises a second weld bead between the second track 606 of the shaft end cap 220 and the planar face 750 of the shaft 210. Thus, the weld joint comprises two co-axial concentric weld beads at the two co-axial concentric tracks 602 of the shaft end cap 220. The two co-axial concentric weld beads fixedly couple the shaft end cap 220 to the shaft 210 at the planar face 750 of the shaft 210. Inclusion of more than one weld bead strengthens a structural resistance of the weld joint, compared to welds that comprise a single weld bead. For example, when a load is applied to the weld joint and/or a weld zone in which the weld joint is positioned (e.g., within the dashed oval 702), load stress may concentrate near a fusion line of the weld joint where the weld bead intersects with each of the shaft 210 and the shaft end cap 220. Depending on a magnitude of the load, this may lead to fracture of the weld joint, and potential uncoupling of the shaft 210 and the shaft end cap 220. By forming the second weld bead at the inside of a first weld bead, thus forming weld joint of multiple weld beads, a joint strength and resistance to material degradation of the weld joint may be increased. Concentration of load stress on the weld joint is distributed among the first weld bead and the second weld bead, and tolerance of the applied load may increase.

The weld joint (e.g., the first weld bead and the second weld bead) are formed using CD welding. A CD welding process does not include pre-heating of parts (e.g., heating parts in the range of 200-350° C.) before a welding operation, as is common with other welding techniques like laser beam welding. Assembling the rotor shaft assembly 202 using CD welding rather than other welding techniques that use relatively high pre-heat temperatures enables the flow insert 230 to be formed of plastic. Welding techniques that user relatively high pre-heat temperatures may structurally deform plastic of the flow insert 230, and may cause the flow insert 230 to lose material properties due to high temperatures. Forming the flow insert 230 of a low-mass and structurally rigid material, such as plastic, is desirable to decrease an overall mass of the rotor shaft assembly 202. Therefore, CD welding is a desirable method for assembling the rotor shaft assembly 202.

A liquid flow path through a portion of the rotor shaft assembly 202 is illustrated in FIG. 7 by a series of arrows 710. The liquid may be a lubricant and/or a coolant. For example, the liquid may be oil. The liquid may be directed through the rotor shaft assembly 202 from the inlet 402 of the shaft end cap 220 to the outlet 404 of the shaft 210 (not shown in FIG. 7). The liquid enters the rotor shaft assembly 202 at inlet 402 of the shaft end cap 220 (not shown in FIG. 7) and flow through a central passage 712 of the shaft end cap 220. The liquid flows around the flow insert 230 via a channel formed between the flow insert 230 and the dome extension 618 of the shaft end cap 220. At the one or more protrusions of the shaft end cap 220 (e.g., the first protrusion 502 and the second protrusion 504), the liquid flows around the protrusion and into the respective socket. The weld joint may further direct liquid flow and prevent liquid from leaking out of the rotor shaft assembly 202 at the interface between the shaft 210 and the shaft end cap 220. For example, the weld beads may be less permeable to liquid, compared to other coupling methods such as a press fit coupling. Further, inclusion of the trough 608 between the first track 604 and the second track 606 may serve to capture liquid that may permeate the second track 606. The liquid flow continues through a gap between the flow insert 230 and internal walls 530 of the shaft 210, and to the outlet 404 of the shaft 210.

Briefly returning to FIG. 5, in some examples the flow insert 230 may include one or more recess 532 that extend into the outer shell 520 and/or the inner core 522 of the flow insert 230. The one or more recesses 532 may retain liquid and assist in preventing liquid overflow and/or reducing a liquid flow rate out of the outlet 404 of the shaft 210. For example, a first recess 532a is axially aligned (e.g., along the z-axis) with the outlet 404 of the shaft 210.

FIG. 8 shows a second cross-sectioned side view 800 of the rotor shaft assembly 202 of FIGS. 2-7, taken along the line B-B in FIG. 4. As shown in FIG. 8, the shaft end cap 220 may include at least one angular channel 802 that extends from an external surface 804 of the shaft end cap 220, at a non-zero angle, towards the second end 620 of the shaft end cap 220 and the central axis 499. Each of the at least one angular channel 802 may be hollow, and thus may reduce a mass of the shaft end cap 220.

FIG. 9 is a flow chart illustrating a method 900 for assembling a shaft assembly. For example, the method 900 may be implemented to assemble the rotor shaft assembly 202 described with respect to FIGS. 2-8. The method 900 is thus described with respect to the rotor shaft assembly 202 and components thereof, for exemplary purposes.

At 902, the method 900 includes inserting a flow insert into a first end of a shaft. The flow insert is formed at least in part of plastic. The flow insert is inserted into the first end of the shaft such that a conical front end of the flow insert that is configured to mate with the shaft end cap is positioned at the first end of the shaft. For example, the conical front end of the flow insert may include at least one socket that is configured to receive a protrusion of the shaft end cap. Additionally, the flow insert may be configured with a recess at the second end of the flow insert. The flow insert may be inserted into the shaft such that the recess of the flow insert is in axial alignment with the outlet of the shaft.

At 904, the method 900 includes aligning a shaft end cap with the flow insert via at least one protrusion of the flow insert that interfaces with at least one socket of the shaft end cap. The flow insert is arranged in a cavity shaped by the shaft and the shaft end cap. A plastic shell of the flow insert creates high electrical resistance and electrically isolates the shaft end cap from the shaft during coupling of the shaft end cap and the shaft, via welding.

At 906, the method 900 includes welding the shaft end cap to the shaft using capacitive discharge welding. A weld joint that couples the shaft end cap to the shaft comprises at least two co-axial and concentric annular weld beads. Welding the shaft end cap to the shaft comprises axially aligning a second end of the shaft end cap with the first end of the shaft, and welding the shaft end cap to the shaft. The shaft end cap and the shaft are in contact at a first circular weld bead between a first track of two co-axial concentric tracks of the shaft end cap and a planar surface of the shaft, and at a second circular weld bead between a second track of the two co-axial concentric tracks of the shaft end cap and the planar surface of the shaft. The second circular weld bead and the second track may have smaller diameters than the first circular weld bead and the first track, respectively. Axially aligning the second end of the shaft end cap with the first end of the shaft includes inserting a dome extension of the shaft end cap into a hollow body of the shaft. After 906, the method 900 ends.

In this way, the rotor shaft assembly comprising a shaft and a shaft end cap coupled by two co-axial concentric weld beads, and having a plastic flow insert arranged in a cavity formed by the shaft and the shaft end cap provides a lightweight solution for a rotor shaft that also enables efficient lubrication and cooling thereof. Technical benefits of the rotor shaft assembly described herein include reduced energetic losses due to excessive heating of the rotor shaft assembly. Additionally, the rotor shaft assembly provides reduced degradation thereof due to arrangement of the weld joint away from areas of stress and/or load concentration, as well as inclusion of at least two co-axial concentric weld beads forming the weld joint. Forming the flow insert of plastic enables a reduced mass of the rotor shaft assembly, compared to rotor shaft assemblies having metal or other dense materials forming the flow insert. Using capacitive discharge welding to form the weld joints enables use of a plastic flow insert, as CD welding does not demand high temperature preheating of elements, which may structurally deform the plastic flow insert. The weld joint formed by CD welding provides a desired rigidity and structural integrity of the weld joint.

The disclosure also provides support for a rotor shaft assembly, comprising: a shaft, a shaft end cap having two co-axial concentric tracks with a trough therebetween at a second end of the shaft end cap, where the shaft end cap is coupled to the shaft via two co-axial concentric weld beads at the two co-axial concentric tracks of the shaft end cap, and a flow insert arranged in a cavity shaped by the shaft and the shaft end cap, where the flow insert is formed at least in part of plastic. In a first example of the system, the shaft has a planar face at a first end of the shaft, and where the two co-axial concentric weld beads fixedly couple the shaft end cap to the shaft at the planar face of the shaft. In a second example of the system, optionally including the first example, the shaft end cap comprises at least one protrusion that interfaces with at least one socket of the flow insert, where the at least one protrusion is configured to block rotation of the flow insert. In a third example of the system, optionally including one or both of the first and second examples, each of the at least one protrusion is formed of stainless steel. In a fourth example of the system, optionally including one or more or each of the first through third examples, the shaft end cap further comprises at least one angular channel that extends from an external surface of the shaft end cap, at a non-zero angle, towards the second end of the shaft end cap and a central axis of the shaft end cap. In a fifth example of the system, optionally including one or more or each of the first through fourth examples, the second end of the shaft end cap has a dome extension that extends beyond the two co-axial concentric tracks along a length of the shaft end cap, and where a concave portion of the dome extension faces away from a first end of the shaft end cap, opposite the second end of the shaft end cap. In a sixth example of the system, optionally including one or more or each of the first through fifth examples, a diameter of each concentric track of the two co-axial concentric tracks is greater than a diameter of the dome extension. In a seventh example of the system, optionally including one or more or each of the first through sixth examples, the two co-axial concentric weld beads are capacitive discharge (CD) weld beads. In an eighth example of the system, optionally including one or more or each of the first through seventh examples, a first weld bead of the two co-axial concentric weld beads has a larger diameter than a second weld bead of the two co-axial concentric weld beads. In a ninth example of the system, optionally including one or more or each of the first through eighth examples, a first track of the two co-axial concentric tracks has a larger diameter than a second track of the two co-axial concentric tracks. In a tenth example of the system, optionally including one or more or each of the first through ninth examples, an axial play of the flow insert inside the cavity is between 0.05 mm and 0.5 mm. In a eleventh example of the system, optionally including one or more or each of the first through tenth examples, the flow insert is a plastic outer shell with a hollow inner core. In a twelfth example of the system, optionally including one or more or each of the first through eleventh examples, the flow insert is a plastic outer shell with a plastic inner core.

The disclosure also provides support for a method for assembling a rotor shaft, comprising: inserting a flow insert into a first end of a shaft, the flow insert formed at least in part of plastic, aligning a shaft end cap with the flow insert via at least one protrusion of the shaft end cap that interfaces with at least one socket of the flow insert, welding the shaft end cap to the shaft using capacitive discharge welding, where a weld joint that couples the shaft end cap to the shaft comprises at least two co-axial and concentric annular weld beads, and where the flow insert is arranged in a cavity shaped by the shaft and the shaft end cap. In a first example of the method, welding the shaft end cap to the shaft comprises: axially aligning a second end of the shaft end cap with the first end of the shaft, and welding the shaft end cap to the shaft, such that the shaft end cap and the shaft are in contact at a first circular weld bead between a first track of two co-axial concentric tracks of the shaft end cap and a planar surface of the shaft, and at a second circular weld bead between a second track of the two co-axial concentric tracks of the shaft end cap and the planar surface of the shaft. In a second example of the method, optionally including the first example, axially aligning the first end of the shaft end cap with the first end of the shaft includes inserting a dome extension of the shaft end cap into a hollow body of the shaft and aligning the shaft end cap with the flow insert via the at least one protrusion of the flow insert and the at least one socket of the shaft end cap. In a third example of the method, optionally including one or both of the first and second examples, a plastic shell of the flow insert creates high electrical resistance and electrically isolates the shaft end cap from the shaft during welding.

The disclosure also provides support for a system, comprising: an electric motor comprising a housing, a stator arranged in the housing and surrounding a rotor, a shaft arranged in the housing and at least partially surrounded by the rotor, wherein the shaft comprises a flow insert arranged therein, the flow insert formed at least in part of plastic, and a shaft end cap having two co-axial concentric tracks with a trough therebetween, where the shaft end cap is coupled to the shaft via two co-axial concentric weld beads at the two co-axial concentric tracks of the shaft end cap. In a first example of the system, the system further comprises: lamination stacks, and a balancing plate, wherein a first end of the shaft and the shaft end cap are positioned on a first side of the lamination stacks, and the balancing plate is positioned between the shaft and the lamination stacks. In a second example of the system, optionally including the first example, a second end of the shaft extends out of a second side of the lamination stacks, opposite the first side, and where the second end of the shaft is a spline side of the shaft.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A rotor shaft assembly, comprising:
a shaft;
a shaft end cap having two co-axial concentric tracks with a trough therebetween at a second end of the shaft end cap, where the shaft end cap is coupled to the shaft via two co-axial concentric weld beads at the two co-axial concentric tracks of the shaft end cap; and
a flow insert arranged in a cavity shaped by the shaft and the shaft end cap, where the flow insert is formed at least in part of plastic.

2. The rotor shaft assembly of claim 1, wherein the shaft has a planar face at a first end of the shaft, and where the two co-axial concentric weld beads fixedly couple the shaft end cap to the shaft at the planar face of the shaft.

3. The rotor shaft assembly of claim 1, wherein the shaft end cap comprises at least one protrusion that interfaces with at least one socket of the flow insert, where the at least one protrusion is configured to block rotation of the flow insert.

4. The rotor shaft assembly of claim 3, wherein each of the at least one protrusion is formed of stainless steel.

5. The rotor shaft assembly of claim 1, wherein the shaft end cap further comprises at least one angular channel that extends from an external surface of the shaft end cap, at a non-zero angle, towards the second end of the shaft end cap and a central axis of the shaft end cap.

6. The rotor shaft assembly of claim 1, wherein the second end of the shaft end cap has a dome extension that extends beyond the two co-axial concentric tracks along a length of the shaft end cap, and where a concave portion of the dome extension faces away from a first end of the shaft end cap, opposite the second end of the shaft end cap.

7. The rotor shaft assembly of claim 6, wherein a diameter of each concentric track of the two co-axial concentric tracks is greater than a diameter of the dome extension.

8. The rotor shaft assembly of claim 1, wherein the two co-axial concentric weld beads are capacitive discharge (CD) weld beads.

9. The rotor shaft assembly of claim 1, wherein a first weld bead of the two co-axial concentric weld beads has a larger diameter than a second weld bead of the two co-axial concentric weld beads.

10. The rotor shaft assembly of claim 1, wherein a first track of the two co-axial concentric tracks has a larger diameter than a second track of the two co-axial concentric tracks.

11. The rotor shaft assembly of claim 1, wherein an axial play of the flow insert inside the cavity is between 0.05 mm and 0.5 mm.

12. The rotor shaft assembly of claim 1, wherein the flow insert is a plastic outer shell with a hollow inner core.

13. The rotor shaft assembly of claim 1, wherein the flow insert is a plastic outer shell with a plastic inner core.

14. A method for assembling a rotor shaft, comprising:
inserting a flow insert into a first end of a shaft, the flow insert formed at least in part of plastic;
aligning a shaft end cap with the flow insert via at least one protrusion of the shaft end cap that interfaces with at least one socket of the flow insert;
welding the shaft end cap to the shaft using capacitive discharge welding, where a weld joint that couples the shaft end cap to the shaft comprises at least two co-axial and concentric annular weld beads, and where the flow insert is arranged in a cavity shaped by the shaft and the shaft end cap.

15. The method of claim 14, wherein welding the shaft end cap to the shaft comprises:
axially aligning a second end of the shaft end cap with the first end of the shaft; and
welding the shaft end cap to the shaft, such that the shaft end cap and the shaft are in contact at a first circular weld bead between a first track of two co-axial concentric tracks of the shaft end cap and a planar surface of the shaft, and at a second circular weld bead between a second track of the two co-axial concentric tracks of the shaft end cap and the planar surface of the shaft.

16. The method of claim 15, wherein axially aligning the first end of the shaft end cap with the first end of the shaft includes inserting a dome extension of the shaft end cap into a hollow body of the shaft and aligning the shaft end cap with the flow insert via the at least one protrusion of the flow insert and the at least one socket of the shaft end cap.

17. The method of claim 14, wherein a plastic shell of the flow insert creates high electrical resistance and electrically isolates the shaft end cap from the shaft during welding.

18. A system, comprising:
an electric motor comprising a housing;
a stator arranged in the housing and surrounding a rotor;
a shaft arranged in the housing and at least partially surrounded by the rotor, wherein the shaft comprises a flow insert arranged therein, the flow insert formed at least in part of plastic; and
a shaft end cap having two co-axial concentric tracks with a trough therebetween, where the shaft end cap is coupled to the shaft via two co-axial concentric weld beads at the two co-axial concentric tracks of the shaft end cap.

19. The system of claim 18, further comprising:
lamination stacks; and
a balancing plate, wherein a first end of the shaft and the shaft end cap are positioned on a first side of the lamination stacks, and the balancing plate is positioned between the shaft and the lamination stacks.

20. The system of claim 19, wherein a second end of the shaft extends out of a second side of the lamination stacks, opposite the first side, and where the second end of the shaft is a spline side of the shaft.

* * * * *